US011948479B2

(12) United States Patent
Lev

(10) Patent No.: US 11,948,479 B2
(45) Date of Patent: Apr. 2, 2024

(54) TAMPERING DETECTION BASED ON NON-REPRODUCIBLE MARKS IN A TAMPERING EVIDENT ELEMENT

(71) Applicant: NEC Corporation Of America, Herzlia (IL)

(72) Inventor: Tsvi Lev, Tel-Aviv (IL)

(73) Assignee: NEC Corporation Of America, Herzlia (IL)

( * ) Notice: Subject to any disclaimer, the term of this patent is extended or adjusted under 35 U.S.C. 154(b) by 1051 days.

(21) Appl. No.: 16/822,125

(22) Filed: Mar. 18, 2020

(65) Prior Publication Data
US 2021/0295745 A1   Sep. 23, 2021

(51) Int. Cl.
G09F 3/03 (2006.01)
G06T 7/00 (2017.01)
G09F 3/10 (2006.01)

(52) U.S. Cl.
CPC .......... *G09F 3/0376* (2013.01); *G06T 7/0004* (2013.01); *G09F 3/0341* (2013.01); *G09F 3/10* (2013.01)

(58) Field of Classification Search
CPC .. G07F 7/125; G07F 7/08; G09B 5/00; H04N 1/32304; H04N 2201/3281; G06T 1/0028
See application file for complete search history.

(56) References Cited

U.S. PATENT DOCUMENTS

| | | | | |
|---|---|---|---|---|
| 6,748,533 B1 * | 6/2004 | Wu | ........................ | G07F 7/125 |
| | | | | 382/250 |
| 7,047,468 B2 * | 5/2006 | Belluomini | .... | G01R 31/318572 |
| | | | | 714/731 |
| 7,270,866 B2 * | 9/2007 | Noraev | .............. | G11B 20/0021 |
| | | | | 430/270.11 |
| 7,327,248 B2 * | 2/2008 | Odenwald | .............. | G06Q 50/30 |
| | | | | 340/517 |
| 7,483,035 B2 * | 1/2009 | Xu | .......................... | G06T 15/04 |
| | | | | 345/565 |
| 8,131,107 B2 * | 3/2012 | Sun | .......................... | G06T 7/35 |
| | | | | 382/272 |
| 8,233,200 B2 * | 7/2012 | Metayer | ............. | G06K 7/10722 |
| | | | | 348/222.1 |
| 10,158,788 B2 * | 12/2018 | Okuyama | ............ | H04N 1/6072 |

(Continued)

OTHER PUBLICATIONS

Final Official Action dated Feb. 23, 2023 from the US Patent and Trademark Office Re. U.S. Appl. No. 16/876,188. (28 pages).

(Continued)

*Primary Examiner* — Yosef Kassa

(57) ABSTRACT

Provided herein are methods, systems and computer program products for detecting tampering, comprising a sealing process and a seal verification process. The sealing process comprising analyzing a seal applied to seal an object as a tamper evident element, recording one or more manufacturing defects of the seal identified based on the analysis, each of the one or more manufacturing defects comprising one or more non-reproducible deviations from seal generation instructions used to produce the seal, and generating a signature comprising the one or more manufacturing defects. The seal verification process comprising obtaining the signature, analyzing the seal sealing the object, and determining whether the object is tampered based on a comparison between the analyzed seal and the signature.

19 Claims, 8 Drawing Sheets

(56) References Cited

U.S. PATENT DOCUMENTS

| | | |
|---|---|---|
| 10,891,726 B2 * | 1/2021 | Weiß .................. G06T 7/001 |
| 10,891,880 B2 * | 1/2021 | Pallaro .................. G06K 5/00 |
| 2005/0005172 A1 | 1/2005 | Haala |
| 2014/0279613 A1 | 9/2014 | Lee et al. |
| 2015/0089615 A1 | 3/2015 | Krawczyk et al. |
| 2015/0262347 A1 | 9/2015 | Duerksen et al. |
| 2016/0030046 A1 | 10/2016 | Popescu et al. |
| 2018/0260617 A1 | 9/2018 | Jones et al. |
| 2021/0295350 A1 | 9/2021 | Lev et al. |

OTHER PUBLICATIONS

Advisory Action Before the Filing of An Appeal Brief dated Jun. 5, 2023 from US Patent and Trademark Office Re. U.S.Appl. No. 16/876,188. (4 pages).
Restriction Official Action dated Jul. 6, 2022 From the US Patent and Trademark Office Re. U.S. Appl. No. 16/876,188. (7 Pages).
Official Action dated Sep. 15, 2023 From the US Patent and Trademark Office Re. U.S. Appl. No. 16/822,125. (31 Pages).

* cited by examiner

TAMPERING DETECTION BASED ON NON-REPRODUCIBLE MARKS IN A TAMPERING EVIDENT ELEMENT

RELATED PATENTS

This application relates to U.S. Pat. No. 9,760,771 titled "Identification Method, Identification System, Matching Device, and Program", issued on Sep. 12, 2017, the contents of which are all incorporated by reference as if fully set forth herein in their entirety.

This application relates to U.S. Pat. No. 9,842,285 titled "Collation/Retrieval System, Collation/Retrieval Server, Image Feature Extraction Apparatus, Collation/Retrieval Method, and Program", issued on Dec. 12, 2017, the contents of which are all incorporated by reference as if fully set forth herein in their entirety.

This application relates to U.S. Pat. No. 10,083,370 titled "Identification System, Identification Method, Matching Device, and Program", issued on Sep. 25, 2018, the contents of which are all incorporated by reference as if fully set forth herein in their entirety.

This application relates to U.S. Pat. No. 10,235,593 titled "Identification Method, Identification System, Identification Apparatus, and Program", issued on Mar. 19, 2019, the contents of which are all incorporated by reference as if fully set forth herein in their entirety.

This application relates to U.S. Pat. No. 10,262,427 titled "Determination Method, Determination System, Determination Device, and Program", issued on Apr. 16, 2019, the contents of which are all incorporated by reference as if fully set forth herein in their entirety.

This application relates to European Patent No. 2,866,193 titled "Verification Method, Verification System, Verification Apparatus, and Program Therefor", issued on Jun. 12, 2019, the contents of which are all incorporated by reference as if fully set forth herein in their entirety.

This application relates to U.S. Pat. No. 10,540,548 titled "Comparison System, Comparison Apparatus, Comparison Method, and Program", issued on Jan. 21, 2020, the contents of which are all incorporated by reference as if fully set forth herein in their entirety.

FIELD AND BACKGROUND OF THE INVENTION

The present invention, in some embodiments thereof, relates to tampering detection, and, more specifically, but not exclusively, to tampering detection based on non-reproducible manufacturing defects and/or wearing marks identified in a tampering evident element.

Physical tampering of objects, devices, equipment, appliances and/or the like has always been a major concern for hardware manufacturers since malicious parties may access their hardware in attempt to compromise it for one or more malicious purposes.

This concern is constantly increasing as smaller hardware elements may be maliciously inserted into such objects, devices, equipment and/or appliances during one or more stations of their supply chain to gain control over at least some of their resources, data and/or communication.

While preventing such malicious tampering may be highly difficult and resource consuming, detecting the tampering may be somewhat easier and while not preventing the tampering it may allow detecting the tampering and restraining tampered hardware to avoid further damage.

One of the most commonly used means for detecting tampering are tamper evident elements which may be utilized by seals applied to seal the objects, devices, equipment and/or appliances prone to tampering. In particular, the seals may be applied to removable parts, openings, connectors and/or the like such that an attempt to tamper with these objects, devices, equipment and/or appliances in attempt to access their internal elements may essentially lead to damage to the seal(s) in a way that the seal may not be restored to its previous state.

SUMMARY OF THE INVENTION

According to a first aspect of the present invention there is provided a method of detecting tampering, comprising a sealing process and a seal verification process. The sealing process comprising analyzing a seal applied to seal an object as a tamper evident element, recording one or more manufacturing defects of the seal identified based on the analysis, each of the one or more manufacturing defects comprising one or more non-reproducible deviations from seal generation instructions used to produce the seal, and generating a signature comprising the one or more manufacturing defects. The seal verification process comprising obtaining the signature, analyzing the seal sealing the object, and determining whether the object is tampered based on a comparison between the analyzed seal and the signature.

According to a second aspect of the present invention there is provided a system for detecting tampering, comprising one or more processor executing a code comprising code instructions to execute a sealing process and one or more processor executing a code comprising code instructions to execute a seal verification process. The sealing process comprising analyzing a seal applied to seal an object as a tamper evident element, recording one or more manufacturing defects of the seal identified based on the analysis, each of the one or more manufacturing defects comprising one or more non-reproducible deviations from seal generation instructions used to produce the seal, and generating a signature comprising the one or more manufacturing defects. The seal verification process comprising obtaining the signature, analyzing the seal sealing the object, and determining whether the object is tampered based on a comparison between the analyzed seal and the signature.

According to a third aspect of the present invention there is provided a method of detecting tampering, comprising analyzing a wearing state of a seal sealing an object as a tamper evident element, recording one or more wearing marks identified based on the analysis, the one or more wearing marks are induced by one or more wearing conditions, generating, for the seal, a wearing pattern comprising the one or more wearing marks, comparing between the wearing pattern and one or more previous wearing patterns generated based on one or more previous analyses conducted to identify a previous wearing state of the seal, and determining whether the object is tampered based on the comparison between the wearing pattern and one or more of the previous wearing patterns.

According to a fourth aspect of the present invention there is provided a system for detecting tampering, comprising one or more processor executing a code comprising code instructions to analyze a wearing state of a seal sealing an object as a tamper evident element, recording one or more wearing marks identified based on the analysis, the one or more wearing marks are induced by one or more wearing conditions, generate, for the seal, a wearing pattern comprising the one or more wearing marks, compare between the wearing pattern and one or more previous wearing patterns generated based on one or more previous analyses conducted to identify a previous wearing state of the seal, and determine whether the object is tampered based on the comparison between the wearing pattern and one or more of the previous wearing patterns.

In a further implementation form of the first, second, third and/or fourth aspects, the analysis comprises analyzing one or more images depicting the seal.

In a further implementation form of the first and/or second aspects, the seal serving as the tamper evident element is applied such that the seal is visually non-restorable in case the object is tampered with.

In a further implementation form of the first and/or second aspects, the seal serving as the tamper evident element is applied such that the seal is visually non-restorable in case the object is tampered with.

In a further implementation form of the first and/or second aspects, each of the one or more manufacturing defects is not encompassed by any feature defined for the seal by the seal generation instructions.

In a further implementation form of the first and/or second aspects, each of the one or more non-reproducible deviations included in the signature is beyond a production ability of production means available for producing the seal.

In an optional implementation form of the first and/or second aspects, the signature is generated to define one or more of the manufacturing defect(s) with respect to one or more features of an exterior surface of the object.

In an optional implementation form of the first and/or second aspects, determination of whether the object is tampered is based on a change in one or more features of an exterior surface of the object with respect to the seal.

In a further implementation form of the third and/or fourth aspects, each of the one or more wearing marks included in the wearing pattern is beyond a production ability of production means available for producing the seal.

In a further implementation form of the third and/or fourth aspects, the one or more wearing conditions comprising: time, an environmental condition, a mechanical interaction and/or a chemical interaction.

In an optional implementation form of the third and/or fourth aspects, the wearing pattern is generated to define one or more of the wearing mark(s) with respect to one or more features of an exterior surface of the object.

In an optional implementation form of the third and/or fourth aspects, determination of whether the object is tampered is based on a comparison between the wearing pattern and an estimated wearing pattern computed based on the one or more previous wearing patterns.

In an optional implementation form of the third and/or fourth aspects, the estimated wearing pattern is computed according to one or more wearing effect identified by comparing a plurality of previous wearing patterns.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
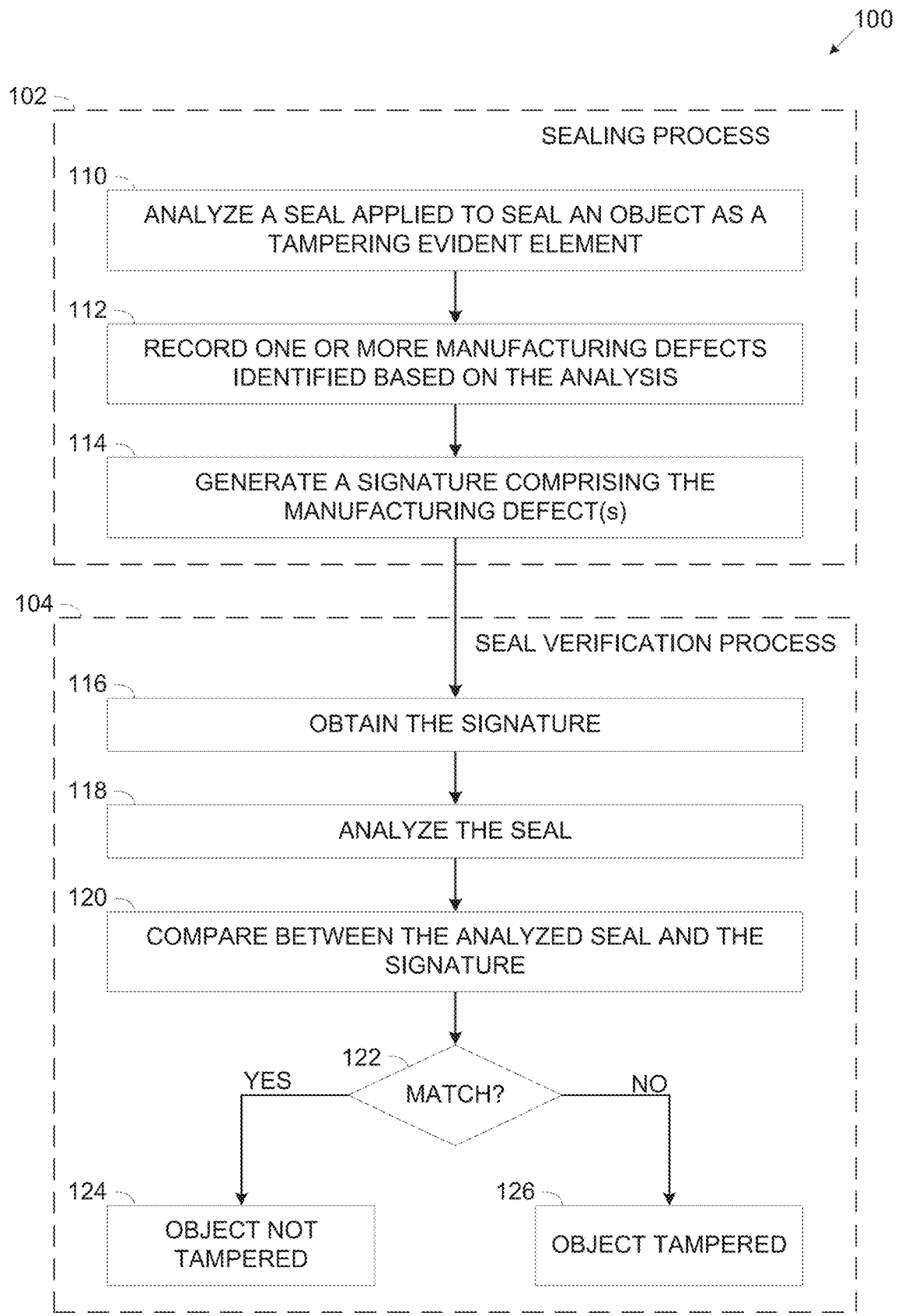
FIG. 1 is a flowchart of an exemplary process of detecting tampering of an object sealed with a seal serving as a tampering evident element based on non-reproducible manufacturing defects identified in the seal, according to some embodiments of the present invention.

The present invention, in some embodiments thereof, relates to tampering detection, and, more specifically, but not exclusively, to tampering detection based on non-reproducible manufacturing defects and/or wearing marks identified in a tampering evident element.

According to some embodiments of the present invention, there are provided methods, systems and computer program products for detecting physical tampering with an object sealed with a seal serving as a tampering evident element based on tracking non-reproducible deviations in manufacturing defects detected in the seal. As such, the seal may be validated not according to a standard common reference reflecting the seal in its ideal state but rather based on the actual state of the seal which may be characterized by unique manufacturing defects deviating from generation instructions of the seal thus distinguishing the seal from other seals produced according to the same generation instructions.

One or more seals, for example, a label, a sticker, a hologram sticker, an adhesive, a gel, a glittering gel comprising glittering particles, a glittering sticker, a strap, a wire, a cable, a padlock and/or the like may be applied to seal an object and serve as tamper evident elements. Specifically, the seal(s) may be applied to seal objects, for example, equipment, appliance, device, package and/or any object having an exterior container (e.g. casing, packaging, etc.) which may be tampered by unauthorized party(s), for example, opened, accessed, removed, breached and/or the like in attempt to access one or more internal elements contained within the exterior container.

The seal(s) are applied, as known in the art, such that any attempt to tamper with the object, specifically opening it, accessing its connector(s) and/or opening(s) and/or the like may essentially cause damage to one or more of the seal(s) which is visually non-restorable to its original state. A visual inspection of the compromised seal may therefore indicate with high certainty whether or not the object was tampered with.

During the sealing process, after the seal is applied to seal the object, the seal may be analyzed, specifically visually analyzed to identify and record one or more manufacturing defects detected in the seal. Each such manufacturing defect may comprise one or more deviations from the generation instructions used to produce the seal and/or to apply the seal to the object. The deviations may result from one or more inconsistencies or deviations during the production and/or application of the seal, for example, one or more imprecisions of an equipment and/or machinery used to produce the seal, one or more inherent random characteristics of one or more processes applied to produce the seal, one or more inherent random parameters, attributes and/or characteristics of one or more materials and/or substances used to produce the seal and/or the like.

The deviations may be analyzed with respect to a resolution, a capacity and/or an ability of the manufacturing means (hardware and/or methods) available for producing the seal and/or the application means available for applying the seal to the object in order to detect and select deviations which are beyond the resolution, the capacity and/or the ability of the manufacturing and/or application means and are therefore non-reproducible. As the selected deviation(s) are non-reproducible, the manufacturing defect(s) comprising and defined by these non-reproducible deviation(s) are also non-reproducible and may therefore make each seal unique compared to at least some other seals produced according to the same generation instructions.

Each seal may be associated with a respective signature comprising the recorded manufacturing defect(s) and may thus serve as a reference record which may be later used for determining whether the seal was compromised which may indicative of a potential tampering with the sealed object.

At any time after the seal is applied to the object, the object may be examined to check and evaluate whether an unauthorized party potentially tampered with the object by verifying an integrity of the seal to determine whether the seal is intact or was it potentially compromised, for example, replaced, altered, reconstructed, fixed, manipulated and/or the like which may be highly indicative of a possible tampering with the object in attempt to access the internal elements.

The seal may be verified according to a comparison between its current state, specifically its distinguishing manufacturing defect(s) to the manufacturing defect(s) recorded in the respective signature created for the seal. Since the non-reproducible deviation(s) characterizing the manufacturing defect(s) may not be reproduced, the seal may not be duplicated exactly the same way the original seal was produced making an attempt to replace the seal, fix a damaged seal and/or the like may be practically impossible thus allowing easy detected of such attempt in the seal verification process.

According to some embodiments of the present invention, there are provided methods, systems and computer program products for detecting tampering of an object sealed with a seal serving as a tampering evident element based on tracking wearing marks detected in the seal. As such, the seal may be validated not according to a standard common reference reflecting the seal in its original and new state but rather based on the wearing state of the seal which may be characterized by unique wearing marks in the seal thus distinguishing the seal from other similar seals.

The seal may be analyzed to detect identify its wearing state and create a wearing pattern accordingly. The wearing state may be characterized by one or more wearing marks, in particular visual wearing marks, for example, de-coloration (fading, dullness, etc.), scratches, tearing, physical deterioration and/or the like induced to the seal by one or more wearing conditions, for example, time, an environmental condition (e.g. radiation, humidity, etc.), a mechanical interaction with one or more objects, a chemical interaction with one or more contacting, radiating and/or emitting materials or substances and/or the like.

In particular, the wearing marks may be analyzed with respect to a resolution, a capacity and/or an ability of manufacturing means available for producing the seal and/or application means available for applying the seal to the object in order to detect and select wearing marks which are beyond the resolution, the capacity and/or the ability of the manufacturing and/or application means and are therefore non-reproducible.

The object may be examined to check and evaluate whether an unauthorized party potentially tampered with the object by comparing the wearing pattern created for the seal to one or more previous wearing patterns created for the seal based on past analyses. The wearing mark(s) identified for the seal may be by their nature non-reproducible since they are inflicted by natural and/or hectic wearing conditions that may not be imitated by artificial equipment and processes. As such, the seal may not be duplicated exactly the same way as the worn seal recorded in the previous wearing pattern(s) making an attempt to replace the seal, fix a damaged seal and/or the like may be practically impossible thus allowing easy detected of such attempt in the seal verification process.

Optionally, in order to evaluate integrity of the seal, the wearing pattern generated for the seal may be compared to an estimated wearing pattern computed for the seal based on one or more previous wearing patterns, in particular a most recent previous wearing pattern. The estimated wearing pattern may include one or more wearing marks which are not recorded in the previous wearing pattern(s) but may be legitimate wearing marks resulting from one or more of the wearing conditions. Optionally, the estimated wearing pattern may be further computed based on one or more wearing effects affecting the specific seal. The wearing effect(s) may be detected by analyzing a gradual degradation in the wearing state of the seal reflected by the plurality of previous wearing patterns.

Detecting tampering with the object by detecting compromised seals based on comparison of their distinguishing and non-reproducible manufacturing defects and/or wearing marks may present major advantages compared to existing methods for detecting physical tampering.

First, in order to detect tampering with the object, the seal needs to be verified to be the original seal initially applied to seal the object. Some of the existing methods may utilize complex seals designed and produced to include unique features which may distinguish each seal thus preventing replacement or fix of a compromised seal damaged while tampering with the object in attempt to conceal the tampering. Such complex seals may be high cost seals requiring special production and/or application means which may significantly increase computation resources utilization, time and/or cost for producing and/or applying the seals. In contrast, taking advantage of the non-reproducible deviations production defect(s) identified in seal which makes each seal unique and distinguishable compared to other similar seals, may allow using simple and cheap seals which may require significantly reduced computation resources, time and/or cost for producing and/or applying the seals.

Moreover, the wearing marks the seal may suffer and exhibit may be also very difficult to duplicate using artificial means and are therefore reproducing such wearing marks to restore a compromised seal may be significantly difficult and practically unfeasible. This may further allow using simple and cheap seals which may further reduce the computation resources, time and/or cost for producing and/or applying the seals. A plurality of wearing patterns may be created for a certain seal which thus creates a "chain of wear" which may make it extremely difficult for a malicious party to successfully replace, fix, adjust and/or configure the certain seal to restore it to its previous state as depicted by the "chain of wear" after the seal is damaged during a tampering attempt with the object.

Furthermore, creating the estimated wearing pattern may allow reliable determination of whether the seal was compromised or not and may significantly reduce the false positive detection in which a seal may be determined to be compromised based on a degradation identified in the wearing state of the seal while in fact the degraded wearing state is caused by the earing conditions and the seal was not compromised.

In addition, adjusting the estimated wearing pattern according to the gradual wearing identified for each seal may allow accurately adjusting and adapting the estimated wearing pattern according to the wearing effects applicable for the specific seal thus further improving accuracy of the acceptable wearing state which may further improve detecting tampering with the object while reducing false positive detection.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of detecting tampering of an object sealed with a seal serving as a tampering evident element based on non-reproducible manufacturing defects identified in the seal, according to some embodiments of the present invention. An exemplary process 100 may be executed to detect tampering with an object, for example, an equipment, an appliance, a device, a package and/or any object having an exterior container, for example, casing, packaging and/or the like which may be tampered by unauthorized party(s), for example, opened, accessed, removed, breached and/or the like in attempt to access one or more internal elements contained within the exterior container.

The process 100 is composed of two main processes, a sealing process 102 and a seal verification process 104. The sealing process 102 is conducted after one or more seals, for example, a label, a sticker, a hologram sticker, an adhesive, a gel, a glittering gel comprising glittering particles, a glittering sticker, a strap, a wire, a cable, a padlock and/or the like are applied to seal the object and serve as tamper evident elements.

During the sealing process 102 one or more of the seal(s) applied to seal the object's exterior container may be analyzed to identify, and record in a respective signature record, one or more manufacturing defects comprising one or more non-reproducible deviations from generation instructions used to produce the seal.

The seal verification process 104 may be conducted at one or more later times, for example, during acceptance inspection of the object, at deployment of the object, during a periodic inspection of the object and/or the like to detect unauthorized tampering with the object. During the seal verification process 104 one or more of the seal(s) sealing the object may be analyzed and compared to its respective signature to determine whether the seal is intact or whether it was compromised, for example, replaced, altered, reconstructed, fixed, manipulated and/or the like which may be highly indicative of a possible tampering with the object in attempt to access the internal elements.

Figure 2:
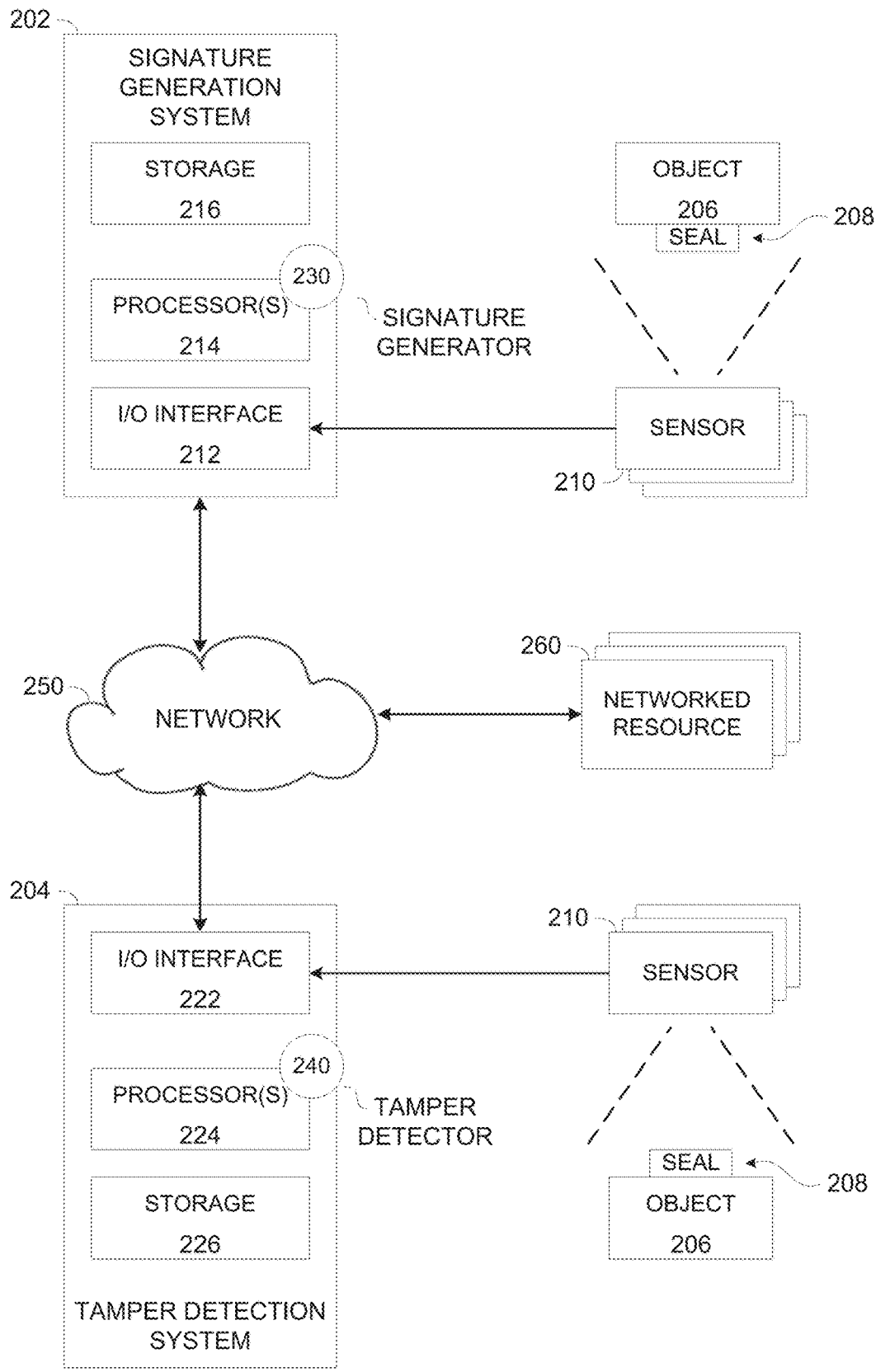
FIG. 2 is a schematic illustration of an exemplary system for detecting tampering of an object sealed with a seal serving as a tampering evident element based on non-reproducible manufacturing defects and/or wearing marks identified in the seal, according to some embodiments of the present invention.

Reference is also made to FIG. 2, which is a schematic illustration of an exemplary system for detecting tampering of an object sealed with a seal serving as a tampering evident element based on non-reproducible manufacturing defects and/or wearing marks identified in the seal, according to some embodiments of the present invention.

A signature generation system 202, for example, a computer, a mobile device (e.g. cellular device, tablet, laptop, etc.), a server, a computing node, a cluster of computing nodes and/or the like may execute a process such as the process 102 constituting the first part of the process 100 to create the signature for each of one or more seals 208, for example, a label, a sticker, a hologram sticker, an adhesive, a gel, a glittering gel comprising glittering particles, a glittering sticker, a strap, a wire, a cable, a padlock and/or the like are applied as known in the art to seal an object 206 and serve as tamper evident elements which may provide indication of whether the object 206 was tampered with. Each seal 208 is applied to seal the object 206 such that an attempt to tamper with the object 206 may damage the seal 208 such that the seal 208 be non-restorable to its original state, specifically visually non-restorable to its original state and/or appearance.

The object 206, for example, an equipment, an appliance, a device, a package, and/or the like may have an exterior container which may be potentially tampered by unauthorized parties, for example, opened, accessed, removed, breached and/or the like in attempt to access one or more internal elements contained within the exterior container, for example, a hardware element, a software element and/or the like. For example, assuming the object 206 comprises n electrical device such as the networking equipment (e.g. router, switch, gateway, etc.), the appliance (e.g. laptop, tablet, cellular device, etc.), the device (e.g. sensor, controller, etc.). In such case, a malicious party may open the case of the electrical object 206 in attempt to install one or more malicious hardware elements, for example, an Integrated Circuit (IC), a module and/or the like to connect to one or more electrical interfaces of the electrical object 206. In another example, a malicious party may attach to one or more network and/or communication connectors located and available at the exterior container to inject one or more malicious software elements to the object 206, for example, a malware, a virus, a Trojan and/or the like.

The seal(s) 208 may be therefore applied to seal the exterior container of the object 206 to prevent tampering with the internal elements of the object 206, for example, over one or more removable and/or detachable parts of the exterior container, on one or more screws locking the exterior container, over one or more network and/or communication connectors located at the exterior container and/or the like.

Reference is now made to FIG. 3A, FIG. 3B, FIG. 3C and FIG. 3D, which are images of exemplary tampering evident elements. A seal such as the seal 208 serving as a tampering evident element may be implemented and/or applied to seal an object such as the object 206 using one or more of a plurality of technologies, martials and/or sealing techniques as known in the art. It is emphasized that the system and method embodiments presented herein are not limited to the described exemplary tamper evident elements, technologies and/or materials and may be similarly applied for tampering detection using other tamper evident elements, technologies and/or materials.

Figure 3A:
FIG. 3A, FIG. 3B, FIG. 3C and FIG. 3D are images of exemplary tampering evident elements.
Figure 3A:
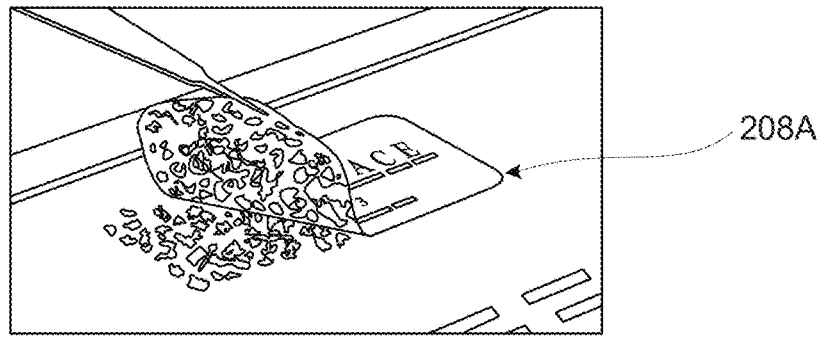
Figure 3A:
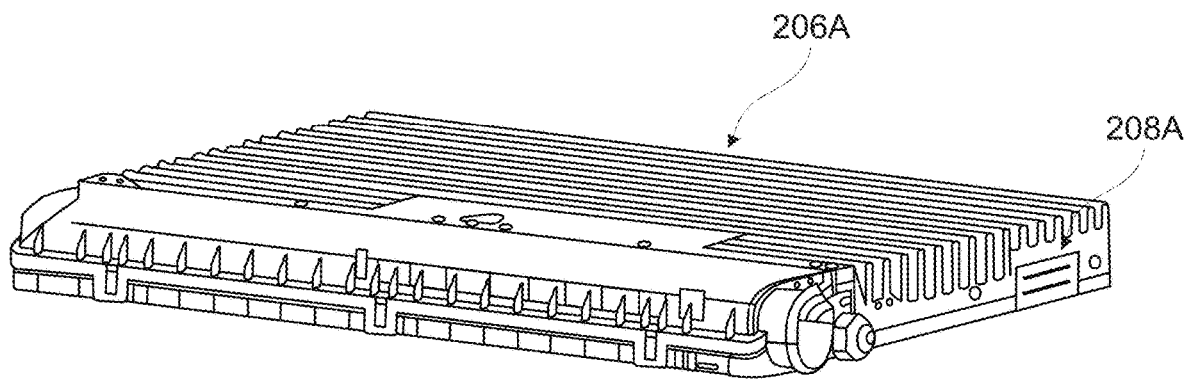

For example, as shown in FIG. 3A, the seal 208 may be implemented using a label 208A, for example, a paper label, an adhesive label, a sticker, a hologram label, a tape, an adhesive tape and/or the like. As shown, the label 208A may be applied, for example, glued to the exterior container, for example, a case of the object 206, for example, a laptop 206A. In particular, the label 208A may be applied over a connection line between two parts of the case of the laptop 206A such that tampering with the laptop 206A, specifically opening the case of the laptop 206A may essentially cause damage to the label 208A, for example, tearing, ripping, distorting and/or the like. The damage to the label 208A may be visually non-restorable such that after damaged, the label 208A may not be restored to its original pre-damaged (pre-tampering) state.

Figure 3B:
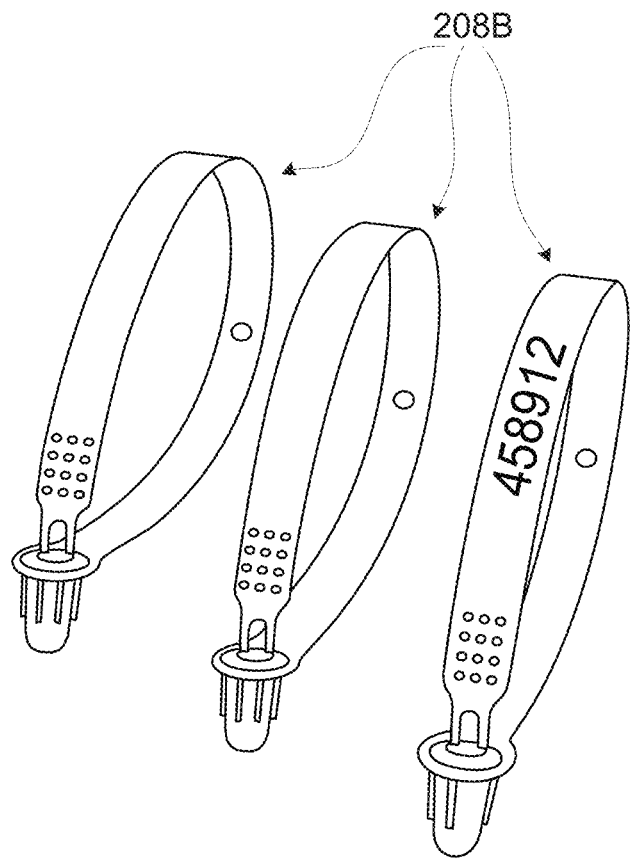
Figure 3B:
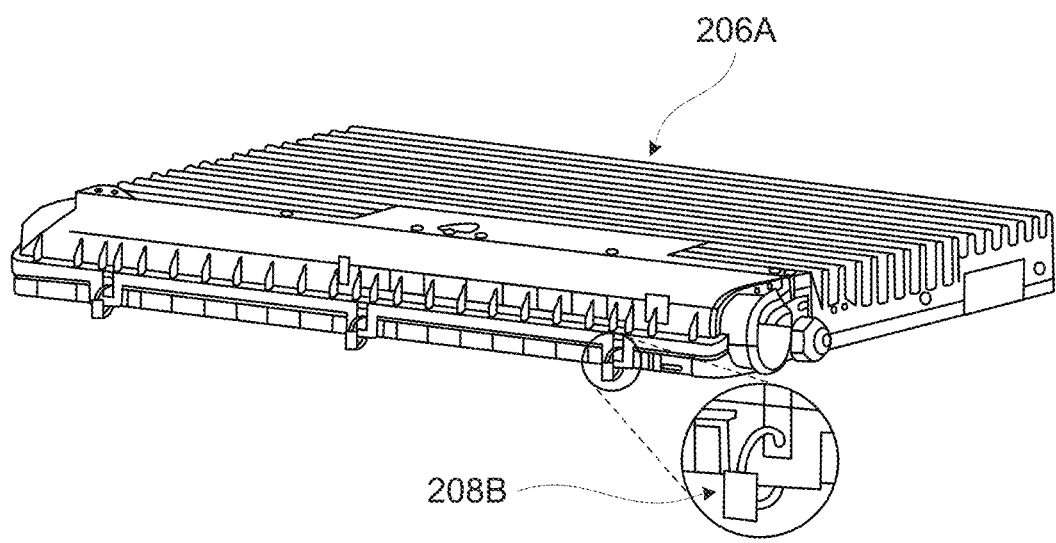

In another example, as shown in FIG. 3B, the seal 208 may be implemented using a strap 208B, for example, an elastic strap, a plastics strap, a rubber strap and/or the like. As shown, the strap 208B may be applied, for example, inserted through a mechanical provision defined and constructed in the exterior container, for example, the case of the object 206, for example, the laptop 206A. The mechanical provision may include a pair of mechanical elements, for example, an opening, a hole, a slit, an aperture and/or the like each disposed on a respective one of two parts of the case of the laptop 206A such that tampering with the laptop 206A, specifically opening the case of the laptop 206A may essentially cause damage to the strap 208B, for example, tearing, ripping, distorting and/or the like. The damage to the strap 208B may be visually non-restorable such that after damaged, the strap 208B may not be restored to its original pre-damaged (pre-tampering) state.

Figure 3C:
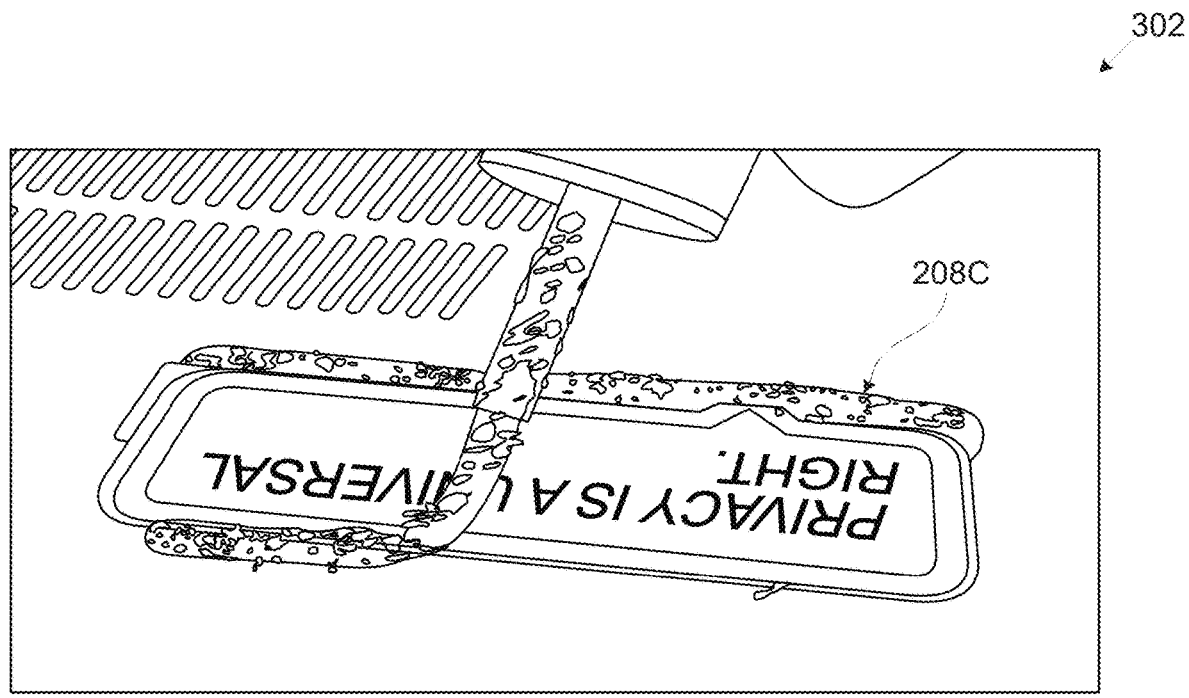
Figure 3C:
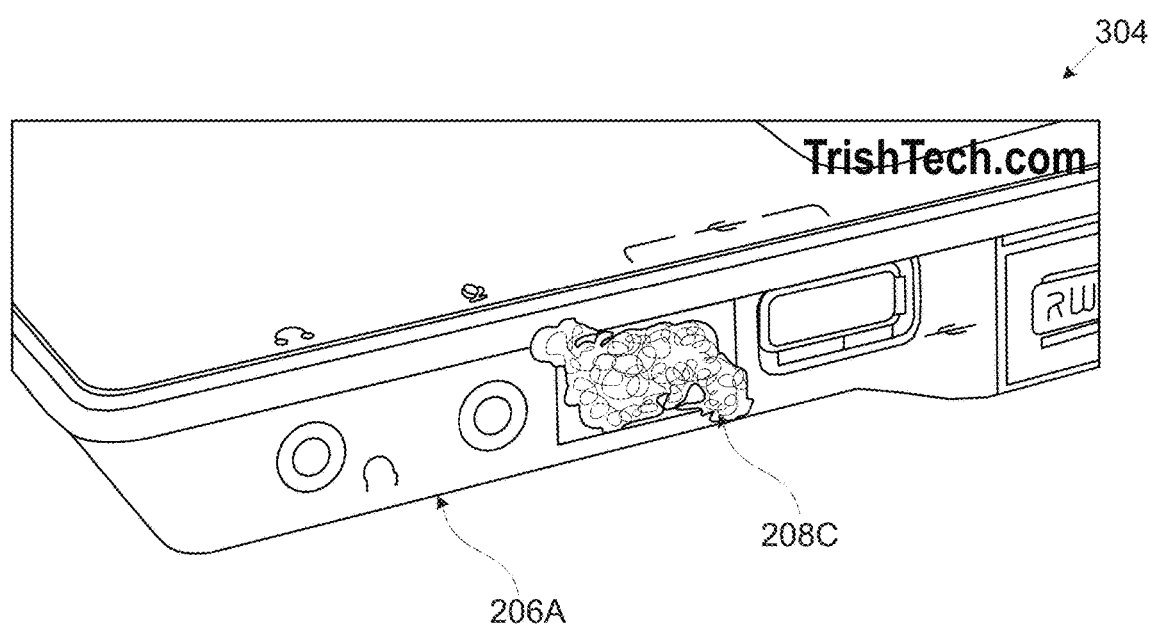

In another example, as shown in FIG. 3C, the seal 208 may be implemented using a gel 208C, for example, a clear gel, a glittering gel embedding glittering particles (e.g. crystalized particles, plastic, etc.) and/or the like. As shown, the gel 208C may be applied, for example, spread over an opening in the exterior container, for example, the case of the object 206. As shown at 302, the gel 208C may be further spread over a label such as the label 208A which is placed on the over the opening in the exterior container of the object 206. In another example, as shown at 304, the gel 208C may be spread over an I/O interface connector available at the exterior container, for example, the case of the object 206, for example, the laptop 206A. The gel 208C may be applied such that tampering with the laptop 206A, specifically opening the case of the laptop 206A and/or accessing the I/O interface connector (e.g. attaching a cable) of the laptop 206A may essentially cause damage to the gel 208C, for example, removal, distorting and/or the like. The damage to the gel 208C may be visually non-restorable such that after damaged, the gel 208C may not be restored to its original pre-damaged (pre-tampering) state.

Figure 3D:
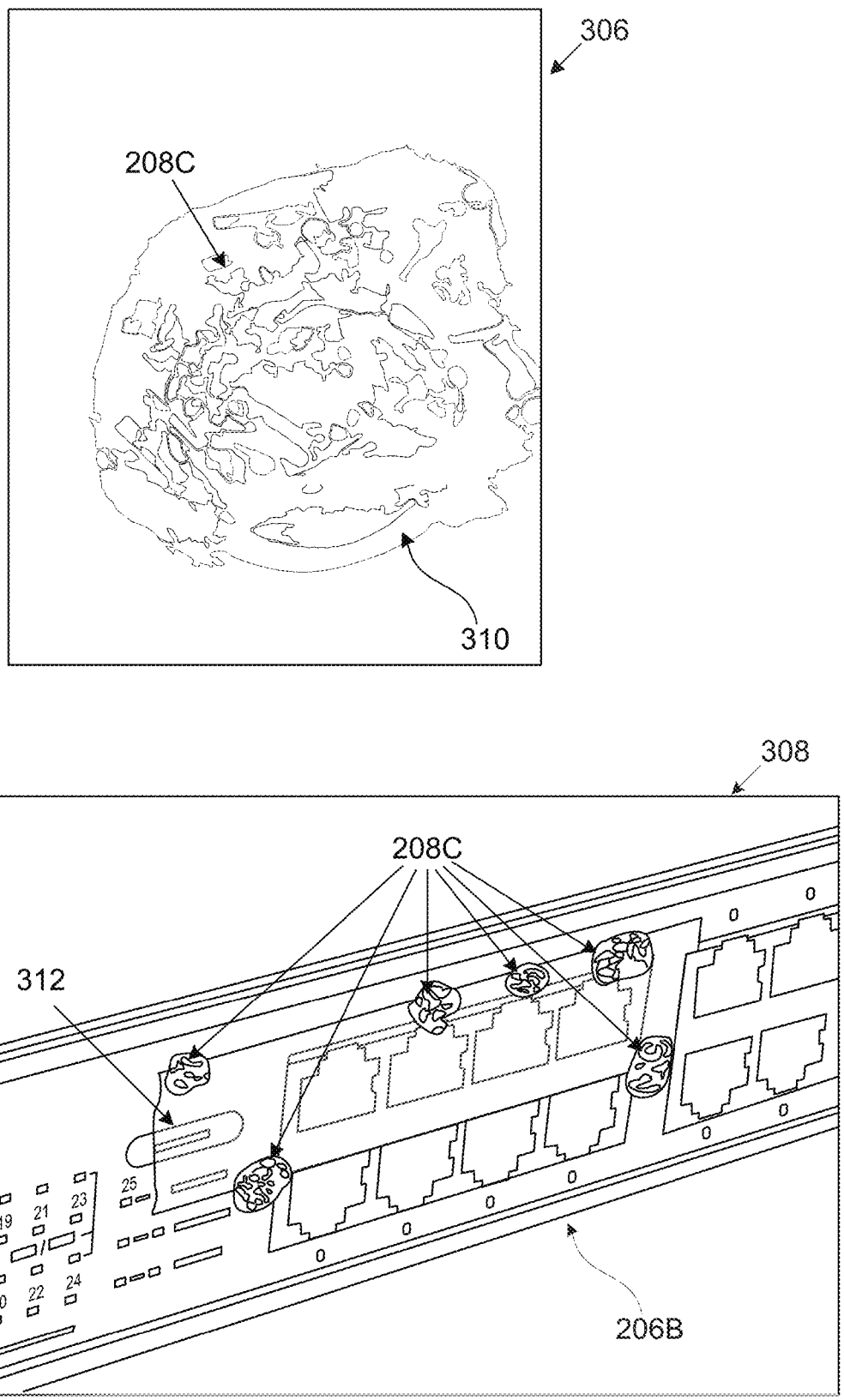

In another example, as shown at 306 in FIG. 3D, the seal 208 implemented using the gel 208C be applied, for example, spread over one or more screws 310 securing together one or more parts of the exterior container, for example, the case of the object 206. The gel 208C may be applied on the screw 310 such that tampering with the laptop 206A, specifically attempting to unscrew the screw 310 in order to open the case of the object 206 may essentially cause damage to the gel 208C, for example, removal, distorting and/or the like. The damage to the gel 208C may be visually non-restorable such that after damaged, the gel 208C may not be restored to its original pre-damaged (pre-tampering) state. In another example, as shown at 308, the gel 208C may be spread over one or more I/O interface connectors, for example, network connectors available at the exterior container, for example, the case of the object 206, for example, a network switch 206B. Moreover, the gel 208C may be applied in conjunction with a tape 312 which is placed over the network connectors. The gel 208C may be applied over the tape 310 such that tampering with the tape 310 in attempt to access the network connector(s) of the network switch 206B may essentially cause damage to the gel 208C, for example, removal, distorting and/or the like. The damage to the gel 208C may be visually non-restorable such that after damaged, the gel 208C may not be restored to its original pre-damaged (pre-tampering) state.

Reference is made once again to FIG. 1.

The signature generation system 202 may include an Input/Output (I/O) interface 212, a processor(s) 214 for executing the process 102 and a storage 216 for storing code (program store) and/or data.

The I/O interface 212 may include one or more wired and/or wireless interconnection interfaces, for example, a Universal Serial Bus (USB) interface, a serial port, a Controller Area Network (CAN) bus interface, a Radio Frequency (RF) interface, a Bluetooth interface and/or the like. The I/O interface 212 may further include one or more wired and/or wireless network interfaces, for example, a Local Area Network (LAN) interface, a Wireless LAN (WLAN, e.g. Wi-Fi) interface and/or the like.

Via the I/O interface 212, the signature generation system 202 may communicate with one or more sensors 210, in particular, imaging sensors such as, for example, a camera, a video camera, a night vision camera, an Infrared camera, a thermal camera and/or the like deployed to capture one or more images of one or more of the seals 208 applied to seal the object 206.

The signature generation system 202 may further communicate, via the I/O interface 212, with one or more remote networked systems 260, for example, a server, a network node, a cluster of network nodes, a cloud service, a cloud platform and/or the like which may provide one or more services, for example, storage services and/or the like.

The processor(s) 214, homogenous or heterogeneous, may include one or more processing nodes arranged for parallel processing, as clusters and/or as one or more multi core processor(s). The storage 216 may include one or more non-transitory persistent storage devices, for example, a hard drive, a Flash array and/or the like. The storage 214 may also include one or more volatile devices, for example, a Random Access Memory (RAM) component and/or the like. The storage 216 may further comprise one or more network storage resources, for example, a storage server, a network accessible storage (NAS), a network drive and/or the like accessible via the I/O interface 212.

The processor(s) 214 may execute one or more software modules such as, for example, a process, a script, an application, an agent, a utility, a tool, an Operating System (OS) and/or the like each comprising a plurality of program instructions stored in a non-transitory medium (program store) such as the storage 216 and executed by one or more processors such as the processor(s) 214. For example, the processor(s) 214 may execute a signature generator 230 for executing the process 102 to create a signature for one or more of the seals 208 applied to seal the object 206. The signature generator 230 may optionally utilize and/or facilitate one or more hardware elements integrated, coupled with and/or utilized by the signature generation system 202, for example, a circuit, a component, an IC, an Application Specific Integrated Circuit (ASIC), a Field Programmable Gate Array (FPGA), a Digital Signals Processor (DSP), a Graphic Processing Units (GPU) and/or the like.

Optionally, the signature generation system 202 and/or the signature generator 230 are provided, executed and/or utilized at least partially by one or more cloud computing services, for example, Infrastructure as a Service (IaaS), Platform as a Service (PaaS), Software as a Service (SaaS) and/or the like provided by one or more cloud infrastructures and/or services such as, for example, Amazon Web Service (AWS), Google Cloud, Microsoft Azure and/or the like.

A tamper detection system 204, for example, a computer, a mobile device (e.g. cellular device, tablet, laptop, etc.), a server, a computing node, a cluster of computing nodes and/or the like may execute a process such as the process 104 constituting the second part of the process 100 to analyze each of one or more of the seal(s) 208 compared to its respective signature and determine accordingly whether the object 206 was tampered with.

The tamper detection system 204 may include an I/O interface 222 such as the I/O interface 212, a processor(s) 224 such as the processor(s) 214 for executing the process 104 and a storage 226 such as the storage 216 for storing code (program store) and/or data.

Via the I/O interface 222, the tamper detection system 204 may communicate with one or more sensors such as the sensors 210 deployed and operated to capture one or more images of one or more of the seals 208 sealing the object 206. The tamper detection system 204 may further communicate, via the I/O interface 222, with one or more of the remote networked systems 260.

The processor(s) 224 may execute one or more software modules, for a tamper detector 240 to detect possible tampering with the object 206 based on analysis of the seal(s) 208 compared to its respective signature. The tamper detector 240 may optionally utilize and/or facilitate one or more hardware elements integrated, coupled with and/or utilized by the tamper detection system 204, for example, a circuit, a component, an IC, an ASIC, an FPGA, a DSP, a GPU and/or the like.

Optionally, the tamper detection system 204 and/or the tamper detector 240 are provided, executed and/or utilized at least partially by one or more cloud computing services, for example, IaaS, PaaS, SaaS and/or the like provided by one or more of the cloud infrastructures and/or services.

The process 100 is described for a single seal 208 applied to seal the object 206. This, however, should not be construed as limiting since the process 100 may be expanded to a plurality of seals 208 applied to seal the object 206.

As shown at 110, the sealing process 102 starts with the signature generator 230 analyzing a seal 208 applied to seal the object 206 as a tampering evident element. In particular, the signature generator 230 may analyze sensory data captured by one or more sensors such as the sensor 210 deployed to depict the seal 208, for example visual sensory data comprising one or more images of the seal 208. While the signature generator 230 may analyze the seal 208 before applied to seal the object 206, the signature generator 230 may typically analyze the seal 208 after applied to seal the object 206 in order to establish a common reference for one or more future analyses of the seal 208 already sealing the object 206 as described herein after.

Specifically, the signature generator 230 may analyze the sensory data, for example, the image(s) of the seal 208 to identify one or more manufacturing defects in the seal 208 which are each characterized by one or more deviations from a set of generation instructions used to produce the seal 208. In particular, each of the manufacturing defect(s) is not defined and/or encompassed by any of the features defining the seal 208, specifically visual features defining the visual appearance of the seal 208, for example, printed features, mechanical features and/or the like.

Each such deviation may result from one or more inconsistencies, deviations and/or inherent random characteristics of the production means used to produce the seal 208 and/or in application means used to apply the seal 208 to seal the product 206.

One or more of the manufacturing defects may be induced, for example, by one or more imprecisions of the production means used to produce the seal 208, for example, equipment, machinery, materials, substances and/or the like. For example, assuming the seal 208 is utilized by a label such as the label 208A comprising marks (printed features) printed and/or marked by one or more printing devices, for example, a printer, a spraying machine, a pressing machine and/or the like using one or more printing materials, for example, ink, paint, pressing element and/or the like. While the label 208A may be produced according to strict generation instructions, one or more of the marks may deviate from a reference mark defined by the generation instructions due to one or more imprecisions and/or parameters of the printing device(s). For example, due to some imprecision in a printing mechanism of a certain printing device, one or more of the printed marks may slightly deviate from a respective reference mark, for example, have a missing portion, have an extra print element, have a different coloration in one or more sections of the mark, have a different width for one or more print elements and/or the like. In another example, assuming the seal 208 is utilized by a strap such as the strap 208B comprising one or more mechanical features created using one or more mechanical machinery, for example, a Computer Numerical Control (CNC) machine, a molding machine and/or the like and optionally comprising one or more marks printed and/or marked by one or more printing devices using one or more printing materials. While the strap 208B may be produced according to strict generation instructions, one or more of the mechanical features, for example, a cavity, a hole, a contour line and/or the like may deviate from a reference mechanical feature defined by the generation instructions due to one or more imprecisions and/or parameters of the mechanical machinery. For example, due to some imprecision in a cutting element of a certain mechanical machine, one or more of the mechanical features may slightly deviate from a respective reference feature, for example, have a protrusion, a gap, a void, a dent and/or the like. In another example, assuming the seal 208 is utilized by a gel such as the gel 208C, in particular a gel 208C comprising a plurality of glittering particles embedded in the gel 208C using one or more automated machines. While the automated machine(s) may be operated to embed the glittering particles according to strict generation instructions, due to one or more imprecisions in a pick and place element of the embedding machine, the position and/or location of one or more of the glittering particles may slightly deviate from the position and/or location defined by the generation instructions.

One or more of the manufacturing defects may result, for example, from one or more inherent parameters, characteristic and/or attributes of one or more materials and/or substances used to produce the seal 208. For example, due to one or more parameters and/or attributes of an ink used to print the marks on a certain label 208A and/or of a material of the certain label 208A on which the marks are printed, the ink may disseminate and/or spread slightly differently in one or more of the marks compared to the respective reference mark defined by the generation instructions. Moreover, the different dissemination and/or spread may be random and potentially different between different marks in the same label 208 and/or between different labels 208A which are all printed according to the same generation instructions. In another example, due to one or more parameters and/or attributes of one or more polymeric materials of a certain strap 208B, the polymeric material(s) may extend from a mold used to produce the certain strap 208B and/or may change or deform after extracted from the mold.

One or more of the manufacturing defects may result, for example, from one or more imprecisions of the application means used to automatically apply the seal 208 to seal the object 206, for example, equipment, machinery, materials, substances and/or the like. For assuming the seal 208 comprises a certain gel 208C which is automatically applied to seal the object 206 using one or more automated tools, machines and/or devices. In such case, due to one or more parameters and/or attributes of one or more polymeric materials of a certain gel 208C, during application of the gel 208C to the object 206 by an application device, the gel 208C may distribute and/or disseminate over the object 206 slightly differently compared to the generation instructions. Moreover, the different distribution and/or dissemination may be random and potentially different between different applications of the same gel 208C all applied according to the same generation instructions. In another example, assuming the seal 208 comprises a certain label 208A which is automatically applied to seal the object 206 using one or more automated tools, machines and/or devices comprising an application element. In such case, due to one or more imprecisions and/or inaccuracies in the automated application element, during application of the certain label 208A to seal the object 206, the certain label 208A may be inaccurately applied to the object 206 thus deviating from the generation (application) instructions. For example, the certain label 208A may be positioned in a slightly rotated angle compared to the positioning defined by the application instructions. In another example, one or more edges of the certain label 208A may be slightly folded, distorted, wrinkled and/or the like.

The signature generator 230 may analyze each of the deviation(s) detected in the seal 208 with respect to a resolution, a capacity and/or an ability of the manufacturing means (hardware and/or methods) available for producing the seal 208 and/or the application means available for applying the seal 208 to the object 206. Based on the analysis, the signature generator 230 may select only deviations which are beyond the resolution, ability and/or capacity of the production means and/or the application means and are therefore non-reproducible. For example, the signature generator 230 may select a certain deviation in a certain mark printed on a certain seal 208, for example, a certain label 208A which results from an imprecision in the printing device used to print the certain mark since such deviation may typically be beyond a printing resolution of the printing device and therefore the certain deviation may not be reproduced. In another example, the signature generator 230 may select a certain deviation in a certain mark printed on a certain seal 208, for example, a certain label 208A and/or a certain gel 208C which results from the random dissemination of the ink or the gel respectively which may be therefore non-reproducible. In another example, the signature generator 230 may select a certain deviation in a positioning of a certain seal 208, for example, a certain label 208A which results from an imprecision in the applying device used to apply the certain label 208A to seal the object 206 since such deviation may typically be beyond the application resolution of the applying device and therefore the deviation may be non-reproducible.

Optionally, the signature generator 230 analyzes the object 206, specifically one or more exterior surfaces of the object 206, specifically exterior surfaces of the container of the object 206 with respect to the seal 208. The signature generator 230 may analyze the sensory data depicting the seal 208, for example, the image(s) of the seal 208 to identify one or more features of one or more of the exterior surfaces. As such, the signature generator 230 may identify one or more correlations, for example, a position, a location, a proportion and/or the like of the seal 208 with respect to the feature(s) of the exterior surface(s). The signature generator 230 may further correlate one or more of the manufacturing defect(s) detected in the seal 208 with one or more of the features of one or more of the exterior surfaces of the object 206.

For example, assuming the seal 208, for example, a certain label 208A is applied to seal a certain opening in the container of the object 206 having a certain shape, for example, an oval shape which is partially surrounded by an elevated perimeter edge. In such case, the signature generator 230 may identify the exact positioning, i.e., orientation and/or location of the certain label 208A with respect to the oval shape and/or with respect to the elevated perimeter edge. Since there may be imprecisions in the application element of the automated application machine used to apply the certain label 208A over the certain opening, the positioning of the certain label 208 may deviate from the application (generation) instruction defining the application of the certain label 208a and may thus vary between different applications of different such certain labels 208A over different such certain openings either in the same object 206 or between different such objects 206. In another example, assuming the seal 208, for example, a certain label 208A is applied over two parts of the container of the object 206 which are detachable from each other in a longitude axis. Further assuming that based on the analysis of the image(s) of the seal 208, the signature generator 230 detects a certain manufacturing defect in the certain label 208A. In such case, the signature generator 230 may correlate the certain manufacturing defect, specifically a position, a location and/or an orientation of the certain manufacturing defect with respect to one or more of the features of the container of the object 206, for example, an edge line of one of the two parts sealed together by the certain label 208A.

As shown at 112, the signature generator 230 may record the manufacturing defect(s) detected in the seal 208 based on the analysis of the seal 208, specifically the visual manufacturing defect(s) identified by analyzing the image(s) of the seal 208.

The signature generator 230 may further record one or more of the features of one or more of the exterior surfaces of the container of the object 206 with respect to the seal 208. Moreover, the signature generator 230 may record one or more of the manufacturing defect(s) detected in the seal 208 with respect to one or more of the features detected in the exterior surface, specifically the exterior surface to which the seal 208 is applied.

As shown at 114, the signature generator 230 may generate for the seal 208 a signature, for example, a record (e.g. a file, an image, etc.) comprising (documenting) the manufacturing defect(s) detected in the seal 208. The signature generator 230 may generate the signature to further include one or more of the features of the exterior surface(s) of the object 206 identified with respect to the seal 208. Furthermore, the signature generator 230 may generate the signature to correlate between one or more of the manufacturing defect(s) detected in the seal 208 and one or more of the features detected in the exterior surface(s) of the object 206.

The signature generator 230 may instruct storing the signature in one or more storage locations, for example, the storage 216, one or more of the remote networked resources 260 and/or the like. In particular, the signature may be stored in association with the seal 208 and the object 206 in one or more data structures, for example, a database, an array and/or the like such that each signature may be unambiguous associated with its respective seal 208 and may be easily and definitively accessed and recovered.

A tamper detection process to detect unauthorized tampering with the object 206 may be conducted acceptance may be conducted at one or more later times, for example, during acceptance inspection of the object 206, at deployment of the object 206, during a periodic inspection of the object 206 and/or the like.

During the tamper detection process, the seal verification process 104 may be applied to analyze one or more of the seal(s) 208 sealing the object 206 and compare each seal 208 to its respective signature in order to determine whether the seal 208 is intact or whether it was compromised, replaced, altered and/or the like which may be highly indicative of a possible tampering with the object 206 in attempt to access the internal elements.

As shown at 116, the process 104 starts with the tamper detector 240 obtaining the signature created by the signature generator 230 for the seal 208 from one or more of the storage locations, for example, the storage 216, one or more of the networked resources 260 and/or the like in which the signature is stored. For example, the tamper detector 240 may communicate via the network 250 with the signature generation system 202 and/or with one or more of the networked resources 260 to obtain the signature of the seal 208.

As shown at 118, the tamper detector 240 may analyze the seal 208 applied to seal the object 206 as done by the signature generator 230 during the sealing process 102, in particular the visual appearance of the seal 208. The tamper detector 240 may analyze sensory data captured by one or more sensors such as the sensor 210 deployed to depict the seal 208, specifically visual sensory data comprising one or more images of the seal 208 to identify an appearance of the seal 208 sealing the object 206.

Specifically, the tamper detector 240 analyzes the image(s) of the seal 208 to identify one or more manufacturing defects in the seal 208.

Optionally, the tamper detector 240 analyzes the image(s) captured by the senor(s) 210 to identify one or more of the features of exterior surface(s) of the container of the object 206, specifically with respect to the seal 208 and optionally with respect to one or more of the manufacturing defect(s) detected in the seal 208. This means that the analysis of the seal 208 by the tamper detector 240 is focused on detecting the manufacturing defect(s) rather than on the features of the seal 208 which are defined by the generation instructions.

As shown at 120, the tamper detector 240 may compare the analyzed seal 208 with the signature of the seal 208. In particular, the tamper detector 240 may determine, based on the analysis (step 118), whether the manufacturing defect(s) recorded in the signature of the seal 208 are detected in the analyzed image(s) of the seal 208.

Optionally, in case the signature further comprises correlation between the seal 208 and/or one or more of the manufacturing defect(s) detected in the seal 208 with respect to one or more of the features of the exterior surface(s) of the object 206, the tamper detector 240 may further compare between the correlation recorded in the signature and the correlation identified by analyzing the image(s) of the seal 208.

Optionally, the tamper detector 240 may compare between a state, specifically a visual appearance state of one or more of the features of the exterior surface(s) of the object 206 as identified in the signature and in the analysis of the seal 208 (step 118). The tamper detector 240 may search for a change, for example, a scratch, a dent, a de-coloration and/or the like in one or more of the features recorded in the signature compared to the respective features identified in the analysis of the image(s) depicting these features specifically with respect to the seal 208. For example, assuming the seal 208 is applied to seal a certain I/O connector located at the container of the object 206. Further assuming the certain I/O connector comprises two screws which secure the certain I/O connector to the object 206, specifically to the exterior container of the object 206. In such case, the tamper detector 240 may compare between the state, i.e., the visual appearance of one or both of the screws as recorded in the signature compared to their current state as identified by analyzing the image(s) of the seal 208.

As shown at 122, which is a conditional step, in case the analyzed seal 208 matches the signature, the process 104 branches to 124. However, in case of no match between the analyzed seal 208 and the signature, the process 104 branches to 126. For example, in case a first manufacturing defect which is recorded in the signature is not identified in the analysis of the image(s) of the seal 208, the tamper detector 240 may determine there is no match. Complementary, in case a second manufacturing defect which is not recorded in the signature is identified in the analysis of the image(s) of the seal 208, the tamper detector 240 may determine there is no match. In another example, in case the tamper detector 240 identifies that a certain correlation (e.g. positioning, orientation, etc.) between a third manufacturing defect and a cretin feature of the object 206 is different in the analyzed seal 208 compared to the correlation recorded in the signature, the tamper detector 240 may determine there is no match. In another example, in case there is a change in a visual appearance of a certain feature compared to the visual appearance of this feature in the signature, the tamper detector 240 may determine there is no match.

As shown at 124, since the analyzed seal 208 matches the signature, the tamper detector 240 may determine that the seal 208 is intact and may therefore determine that the object 206 was not tampered with.

As shown at 126, since there is no match between the analyzed seal 208 and the signature, the tamper detector 240 may determine that the seal 208 was compromised, for example, replaced, altered, reconstructed, fixed, manipulated and/or the like which may be highly indicative of a possible tampering with the object 206, specifically with the container of the object 206 sealed by the seal 208 in attempt to access the internal elements of the object 206.

In case the tamper detector 240 determines that the seal 208 is compromised, the tamper detector 240 may initiate one or more actions to inform of the possibility that the object 206 was tampered. For example, the tamper detector 240 may transmit one or more alert messages via the network 250 to one or more automated systems (e.g. security systems, etc.) and/or users (e.g. IT personnel, security personnel, etc.). In another example, the tamper detector 240 may instruct generation of one or more alert indications to be output to one or more users via one or more user interfaces available in the tamper detection system 204, for example, a display, a speaker, an alert Light Emitting Diode (LED) and/or the like.

According to some embodiments of the present invention, an attempt to tamper with the object 206 may be detected based on analysis of a wearing state of one or more of the seals 208 sealing the object 206.

Figure 4:
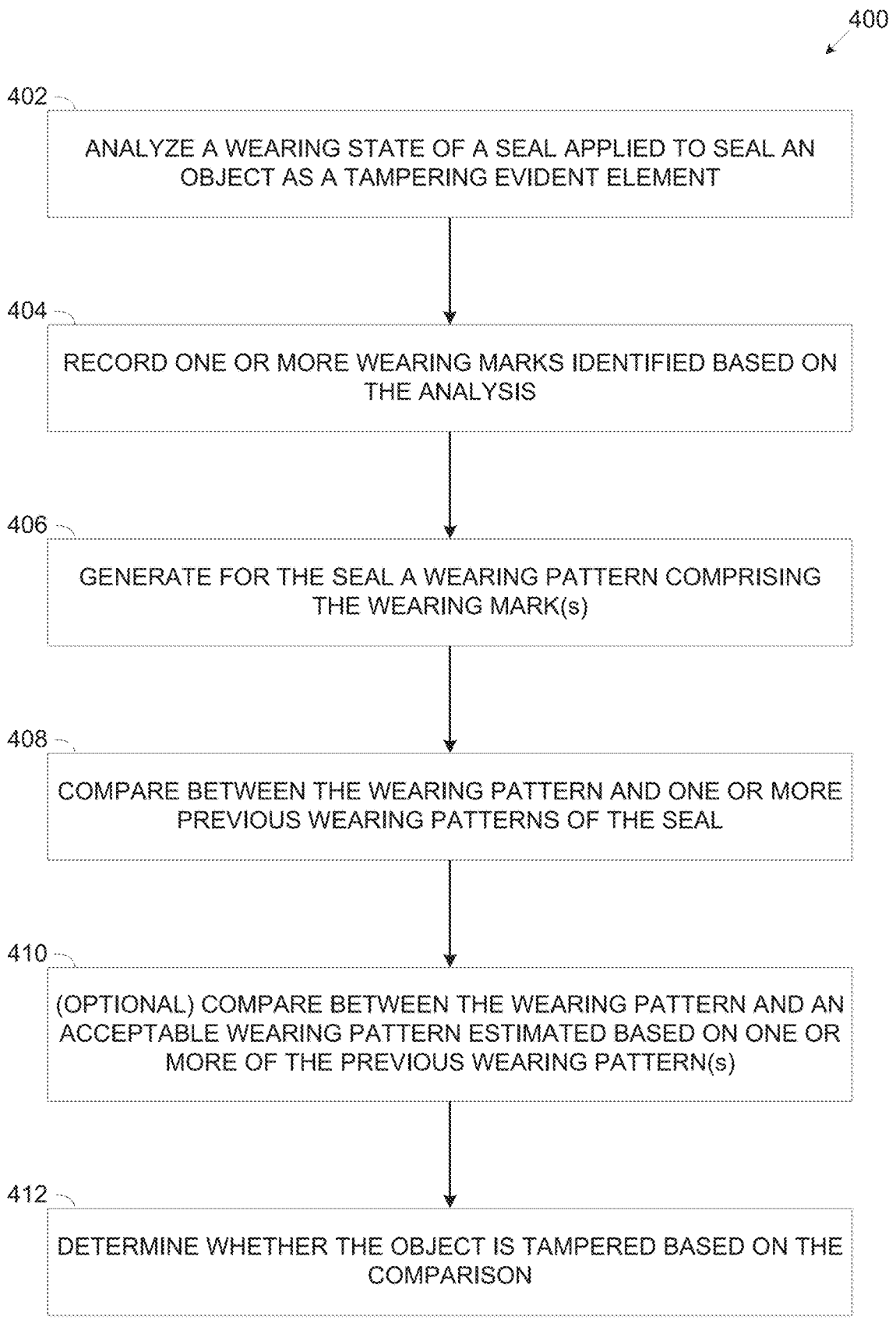
FIG. 4 is a flowchart of an exemplary process of detecting tampering of an object sealed with a seal serving as a tampering evident element based on non-reproducible wearing marks identified in the seal, according to some embodiments of the present invention.

Reference is now made to FIG. 4, which is a flowchart of an exemplary process of detecting tampering of an object sealed with a seal serving as a tampering evident element based on non-reproducible wearing marks identified in the seal, according to some embodiments of the present invention. An exemplary process 400 may be executed by a tamper detector such as the tamper detector 240 executed by a tamper detection system such as the tamper detection system 204 to detect tampering with the object 206 based on changes in a wearing state of one or more seals such as the seal 208 applied to seal an object such as the object 206 as tamper evident elements.

The process 400 is described for a single seal 208 applied to seal the object 206. This, however, should not be construed as limiting since the process 100 may be expanded to a plurality of seals 208 applied to seal the object 206.

As shown at 402, the process 400 starts with the tamper detector 240 analyzing a seal 208 applied to seal the object 206 as a tampering evident element. In particular, the tamper detector 240 may analyze sensory data captured by one or more sensors such as the sensor 210 deployed to depict the seal 208, for example visual sensory data comprising one or more images of the seal 208.

Specifically, the tamper detector 240 may analyze a wearing state of the seal 208 based on the analysis of the image(s) of the seal 208 to identify one or more wearing marks exhibited by the seal 208, in particular visual wearing marks, for example, de-coloration (fading, dullness, etc.), scratches, tearing, physical deterioration and/or the like induced by one or more wearing conditions, for example, time, an environmental condition, a mechanical interaction and a chemical interaction.

The tamper detector 240 may analyze each of the wearing mark(s) detected in the seal 208 with respect to the resolution, the capacity and/or the ability of the manufacturing means available for producing the seal 208 and/or the application means available for to applying the seal 208 to the object 206. Based on the analysis, the tamper detector 240 may select only wearing mark(s) which are beyond the resolution, ability and/or capacity of existing production means available for producing the seal 208 such that the selected wearing marks may be thus non-reproducible.

For example, assuming the seal 208 comprises a certain label such as the label 208A, the certain label 208A may exhibit and/or suffer one or more wearing marks, for example, one or more marks printed on the label may fade and/or become dull over time, due to exposure to sun light and/or the like. In another example, assuming the seal 208 comprises a certain label 208A, the certain label 208A may exhibit wearing mark(s), for example, one or more edges of the certain label 208A may tear, distort and/or become worn over time, due to exposure to sun light, due to mechanical interaction by a user, a technician and/or the like. In another example, assuming the seal 208 comprises a certain strap such as the strap 208B, the certain strap 208B may suffer one or more wearing marks, for example, scratches, distorted edges and/or the like due to mechanical interaction with a user, a technician and/or the like. In another example, assuming the seal 208 comprises a certain label 208A, the certain label 208A may exhibit and/or suffer one or more wearing marks, for example, printed mark(s) which faded and/or became dull due to humidity, chemical interaction with one or more substances which came in contact with the certain label 208A and/or the like.

Figure 5:
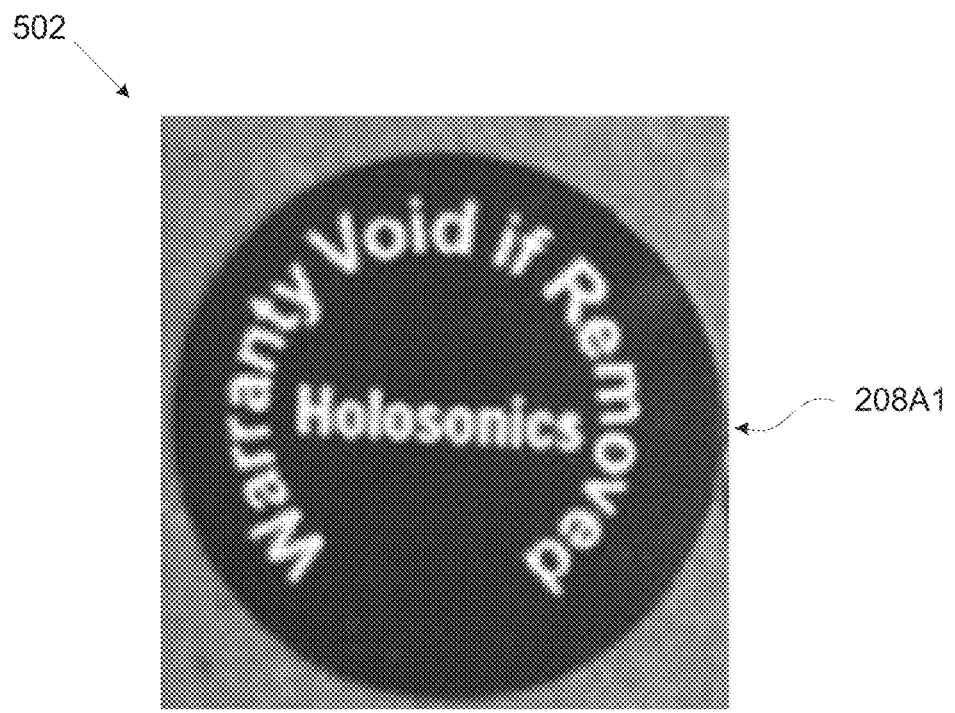
FIG. 5 presents images of an exemplary tampering evident label with and without wearing marks.
Figure 5:
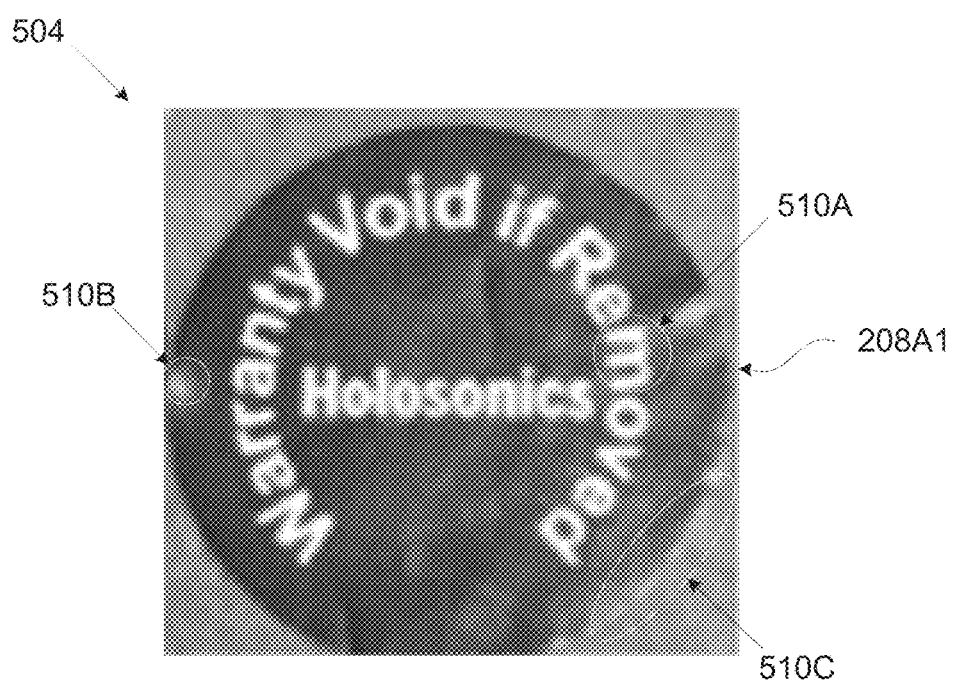

Reference is now made to FIG. 5, which presents images of an exemplary tampering evident label with and without wearing marks. A seal such as the seal 208 may be implemented using an exemplary label 208A1, for example, a paper adhesive label. As shown at 502, in its new state, when applied to seal an object such as the object 206, the label 208A1 may present no wearing marks. However, as shown at 504, at some later time, typically a significant time after applied to the object 206, the label 208A1 may suffer and exhibit one or more wearing marks 510, for example, a fading 510A of one or more marks printed on the label 208A1, a de-coloration 510B of a certain area of the label 208A1, a tear 510C in an edge of the label 208A1 and/or the like.

Reference is made once again to FIG. 1.

As shown at 404, the tamper detector 240 may record the wearing mark(s) detected in the seal 208 based on the analysis of the seal 208, specifically the visual manufacturing defect(s) identified by analyzing the image(s) of the seal 208.

The tamper detector 240 may further record one or more of the features of one or more of the exterior surfaces of the container of the object 206 with respect to the seal 208. Moreover, the signature generator 230 may record one or more of the wearing mark(s) detected in the seal 208 with respect to one or more of the features detected in the exterior surface, specifically the exterior surface to which the seal 208 is applied.

For example, assuming the seal 208 comprises a certain label 208A which is applied over two parts of the container of the object 206 which are detachable from each other in a longitude axis. Further assuming that based on the analysis of the image(s) of the seal 208, the signature generator 230 detects a certain wearing mark in the certain label 208A, for example, a worn edge of the certain label 208A. In such case, the tamper detector 240 may correlate the certain wearing mark, i.e. the worn edge, specifically a position, location and/or orientation of the worn edge with respect to one or more of the features of the container of the object 206, for example, an edge line of one of the two parts sealed together by the certain label 208A.

Optionally, the tamper detector 240 may record the visual appearance state of one or more of the features of the exterior surface(s) of the object 206 as identified in the analysis of the image(s) with respect to the seal 208.

As shown at 406, the tamper detector 240 may generate for the seal 208 a wearing pattern, for example, a record (e.g. a file, an image, etc.) comprising (documenting) the wearing mark(s) detected in the seal 208. The stamper detector 240 may generate the signature to further include one or more of the features of the exterior surface(s) of the object 206 identified with respect to the seal 208. Furthermore, the signature generator 230 may generate the signature to correlate between one or more of the wearing mark(s) detected in the seal 208 and one or more of the features detected in the exterior surface(s) of the object 206.

The tamper detector 240 may instruct storing the wearing pattern in one or more storage locations, for example, the storage 226, one or more of the remote networked resources 260 and/or the like. In particular, the wearing pattern may be stored in association with the seal 208 and the object 206 in one or more data structures, for example, a database, an array and/or the like such that each wearing pattern may be unambiguous associated with its respective seal 208 and may be easily and definitively accessed and recovered.

As shown at 408, the tamper detector 240 may compare between the (current) wearing pattern and one or more wearing patterns generated for the seal 208 based on one or more analyses conducted in the past to identify and evaluate the wearing state of the seal 208.

The tamper detector 240 may retrieve the previous wearing pattern(s) from one or more of the storage locations, for example, the storage 226, one or more of the networked resources 260 and/or the like in which the previous wearing pattern(s) is stored.

Based on the comparison between the wearing patterns, the tamper detector 240 may determine whether the wearing mark(s) recorded in one or more of the previous wearing patterns are present and detected in the currently generated wearing pattern.

Optionally, in case one or more of the previous wearing patterns comprises a correlation between the seal 208 and/or one or more of the wearing marks(s) detected in the seal 208 with respect to one or more of the features of the exterior surface(s) of the object 206, the tamper detector 240 may further compare between the correlation recorded in the current wearing pattern and the respective correlation recorded in the previous wearing pattern(s).

Optionally, in case the visual appearance state of features of the exterior surface(s) of the object 206 are recorded in one or more of the previous wearing patterns, specifically with respect to the seal 208, the tamper detector 240 may further compare between current wearing pattern and the previous wearing pattern(s) to detect one or more changes in the exterior surface(s)'s feature(s), for example, a scratch, a dent, a de-coloration (fading, dullness) and/or the like.

As shown at 410, which is an optional step, the tamper detector 240 may compare between the current wearing pattern and an estimated wearing pattern computed and generated based on one or more of the previous wearing patterns, in particular a most recent previous wearing pattern. The estimated wearing pattern may include one or more wearing marks which are not recorded in the previous wearing pattern(s) but may be legitimate wearing marks resulting from one or more of the wearing conditions.

For example, in case the time since the time of generation of the most recent previous wearing pattern is significantly long, the seal 208 may include one or more wearing marks which are not recorded in the most recent previous wearing pattern but may be legitimate waring marks which may have occurred during the time gap as result of one or more of the wearing conditions. For example, assuming the seal 208 comprises a certain label 208A printed with a certain printed mark. The certain printed mark may fade over time and therefore in case a significant time has elapsed since the time of generation of the most recent previous wearing pattern, the certain printed mark may have faded or further faded during that time. In another example, assuming the seal 208 comprises a certain strap 208B. The strap 208B may suffer one or more wearing marks, for example, a scratch, a de-coloration and/or the like resulting from one or more of the wearing conditions, for example, mechanical and/or chemical interaction.

The tamper detector 240 may therefore analyze one or more of the previous wearing patterns and compute the estimated wearing pattern accordingly to include one or more of the additional wearing marks which are not recorded in the previous wearing patterns. For example, the tamper detector 240 may generate the estimated wearing pattern to include additional wearing mark(s) estimated as acceptable based on the time since the time of generation of the most recent previous wearing pattern.

The tamper detector 240 may further compute the estimated wearing pattern based on one or more wearing effects affecting the seal 208 which are identified by analyze a plurality of previous wearing patterns and the gradual wearing state detected in these wearing patterns. For example, based on analysis of multiple previous wearing patterns, the tamper detector 240 may detect that the seal 208, for example, a certain label 208A suffers gradual rapid wearing of its printed marks, possibly due to exposure to direct sunlight. In such case, based on the time since the time of generation of the most recent previous wearing pattern, the tamper detector 240 may estimate an acceptable current wearing state of the printed marks on the certain label 208A and may compute the estimated wearing pattern accordingly for the certain label 208A. In another example, based on analysis of multiple previous wearing patterns, the tamper detector 240 may detect that the seal 208, for example, a certain strap 208B suffers gradual wearing of edges, possibly due to constant mechanical interaction with one or more other objects. In such case, the tamper detector 240 may estimate an acceptable current wearing state of the edge(s) of the certain strap 208B and may compute the estimated wearing pattern accordingly for the certain strap 208B.

As shown at 412, tamper detector 240 may determine whether the object 206 was tampered with based on the comparison between the current wearing pattern and the previous wearing pattern(s) and optionally based on comparison with the estimated wearing pattern. Specifically, the tamper detector 240 may determine that the object 206 was tampered with in case of no match between the current wearing pattern and the previous wearing pattern(s) and/or the estimated wearing pattern if available which may indicate that the seal 208 is compromised, for example, replaced, altered, reconstructed, fixed, manipulated and/or the like For example, in case a first wearing mark which is recorded in the previous wearing pattern(s) is not recorded in the current wearing pattern, the tamper detector 240 may determine that the seal 208 may be compromised which may indicate that the object 206 may have been tampered with. In another example, in case the tamper detector 240 identifies that a certain correlation (e.g. positioning, orientation, etc.) between a second wearing mark and a cretin feature of the object 206 is different in the current wearing pattern compared to the correlation recorded in the previous wearing pattern(s), the tamper detector 240 may determine that the seal 208 may be compromised which may indicate that the object 206 may have been tampered with. In another example, in case there is a change in a visual appearance of a certain feature recorded in the current wearing pattern compared to the visual appearance of this feature in the previous wearing pattern(s), the tamper detector 240 may determine that the seal 208 may be compromised which may indicate that the object 206 may have been tampered with. In another example, in case a third wearing mark which is not recorded in the previous wearing pattern(s) is beyond an acceptable wearing state computed for the estimated wearing pattern, the tamper detector 240 may also determine that the seal 208 may be compromised which may indicate that the object 206 may have been tampered with.

In case the tamper detector 240 determines that the seal 208 is compromised, the tamper detector 240 may initiate one or more of the actions described herein before to inform of the possibility that the object 206 was tampered. For Naturally, the tamper detector 240 may apply the processes 100 and 400 together and analyze the seal(s) 208 sealing the object 206 to identify either discrepancies in one or more manufacturing defects of the seal(s) 208 and/or changes in the wearing pattern(s) of the seal(s) 208. This may significantly improve the ability of the tamper detector 240 to detect changes to one or more of the seal(s) 208 which are highly indicative of potential tampering with the object 206 and thus significantly improve the capability of the tamper detector 240 to accurately and reliably detect whether the object 206 was tampered.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms tamper evident elements technologies and materials are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of detecting tampering, comprising:
in a sealing process:
analyzing a seal applied to seal an object as a tamper evident element,
recording at least one manufacturing defect of the seal identified based on the analysis, the at least one manufacturing defect comprising at least one non-reproducible deviation from seal generation instructions used to produce the seal, and
generating a signature comprising the at least one manufacturing defect; and
in a seal verification process:
obtaining the signature,
analyzing the seal sealing the object, and
determining whether the object is tampered based on a comparison between the analyzed seal and the signature;
wherein the at least one manufacturing defect is not encompassed by any feature defined for the seal by the seal generation instructions.

2. The method of claim 1, wherein the seal serving as the tamper evident element is applied such that the seal is visually non-restorable in case the object is tampered with.

3. The method of claim 1, wherein the analysis comprises analyzing at least one image depicting the seal.

4. The method of claim 1, wherein the at least one non-reproducible deviation included in the signature is beyond a production ability of production means available for producing the seal.

5. The method of claim 1, further comprising generating the signature to define the at least one manufacturing defect with respect to at least one feature of an exterior surface of the object.

6. The method of claim 1, further comprising determining whether the object is tampered based on a change in at least one feature of an exterior surface of the object with respect to the seal.

7. The method of claim 1, wherein said the at least one manufacturing defect distinguishes the seal from other seals produced according to said generation instructions.

8. The method of claim 1, wherein said at least one manufacturing defect is a printing and/or marking defect which is a member of a group consisting of: having a missing portion, having an extra print element, having a different coloration in one or more sections of a mark and having a different width for one or more print elements.

9. The method of claim 1, wherein said at least one manufacturing defect is a mechanical feature defect, said mechanical feature is a member of a group consisting of: a cavity, a hole and a contour line, wherein said mechanical feature defect is a member of a group consisting of: having a protrusion, having a gap, having a void, and having a dent.

10. The method of claim 1, wherein said at least one manufacturing defect is caused by one or more imprecisions of an application means used to automatically apply the seal to seal the object.

11. A system for detecting tampering, comprising:
in a sealing process:
using at least one processor executing a code, the code comprising code instruction to:
analyze a seal applied to seal an object as a tamper evident element,
record at least one manufacturing defect of the seal identified based on the analysis, the at least one manufacturing defect comprising at least one non-reproducible deviation from seal generation instructions used to produce the seal, and
generate a signature comprising the at least one manufacturing defect; and
in a seal verification process:
using at least one processor executing a code, the code comprising code instruction to:
obtain the signature,
analyze the seal sealing the object, and
determine whether the object is tampered based on a comparison between the analyzed seal and the signature;
wherein the at least one manufacturing defect is not encompassed by any feature defined for the seal by the seal generation instructions.

12. A method of detecting tampering, comprising:
analyzing a wearing state of a seal sealing an object as a tamper evident element;
recording at least one wearing mark identified based on the analysis, the at least one wearing mark is induced by at least one wearing condition;
generating for the seal a wearing pattern comprising the at least one wearing mark;
comparing between the wearing pattern and at least one previous wearing pattern generated based on at least one previous analysis conducted to identify a previous wearing state of the seal; and
determining whether the object is tampered based on the comparison between the wearing pattern and the at least one previous wearing pattern.

13. The method of claim 12, wherein the analysis comprises analyzing at least one image depicting the seal.

14. The method of claim 12, wherein the at least one wearing mark included in the wearing pattern is beyond a production ability of production means available for producing the seal.

15. The method of claim 12, wherein the at least one wearing condition comprising: time, an environmental condition, a mechanical interaction and a chemical interaction.

16. The method of claim 12, further comprising generating the wearing pattern to define the at least one wearing mark with respect to at least one feature of an exterior surface of the object.

17. The method of claim 12, further comprising determining whether the object is tampered based on a comparison between the wearing pattern and an estimated wearing pattern computed based on the at least one previous wearing pattern.

18. The method of claim 17, further comprising computing the estimated wearing pattern according to at least one wearing effect identified by comparing a plurality of previous wearing patterns.

19. A system for detecting tampering, comprising:
using at least one processor executing a code, the code comprising:
code instruction to analyze a wearing state of a seal sealing an object as a tamper evident element;

code instruction to record at least one wearing mark identified based on the analysis, the at least one wearing mark is induced by at least one wearing condition;

code instruction to generate for the seal a wearing pattern comprising the at least one wearing mark;

code instruction to compare between the wearing pattern and at least one previous wearing pattern generated based on at least one previous analysis conducted to identify a previous wearing state of the seal; and code instruction to determine whether the object is tampered based on the comparison between the wearing pattern and the at least one previous wearing pattern.

* * * * *